(No Model.)
O. MARTINSON.
MEASURING FAUCET.
No. 377,165. Patented Jan. 31, 1888.
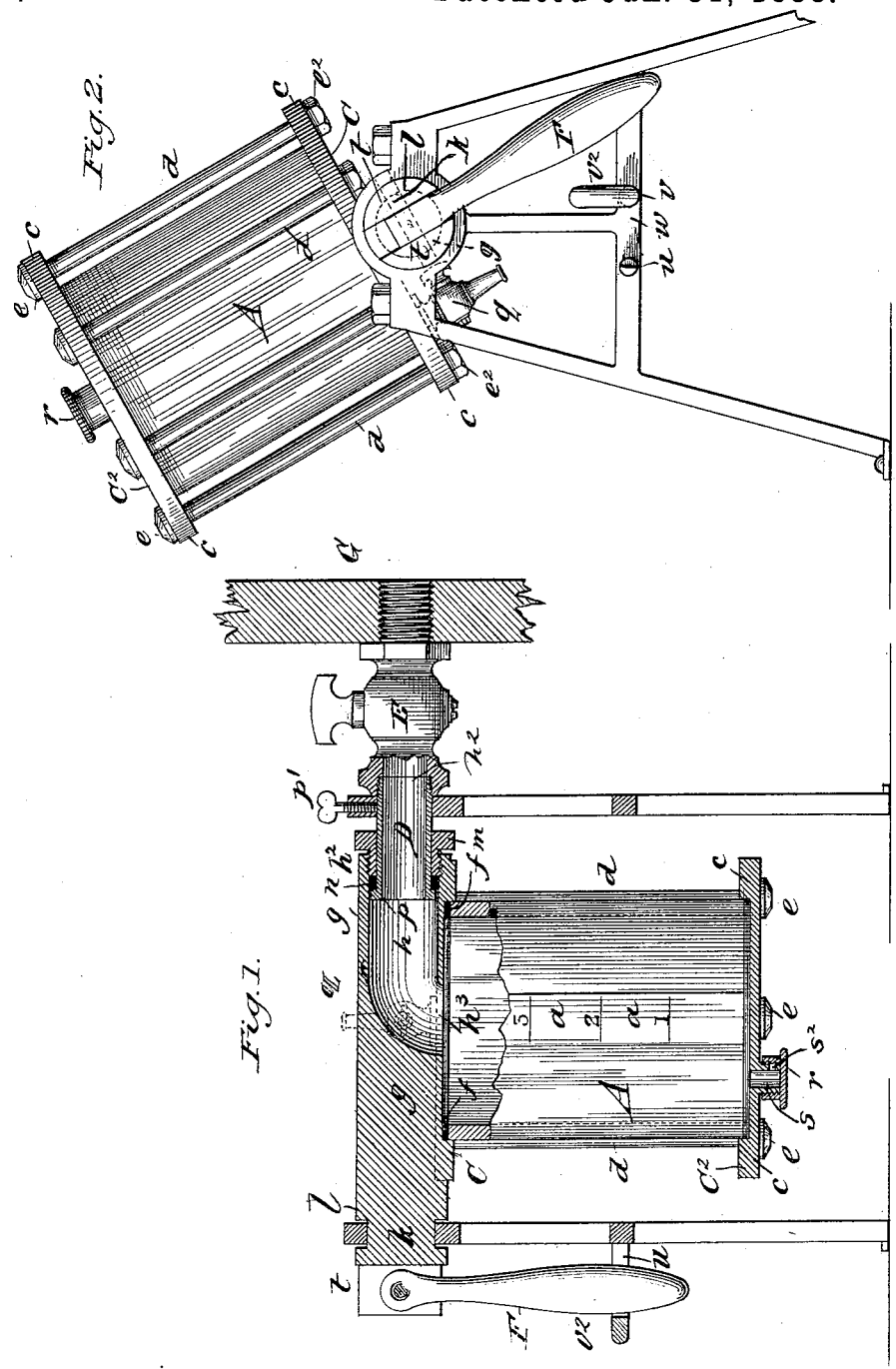
WITNESSES:
John A. Ellis
C. Sedgwick
INVENTOR:
O. Martinson
BY Munn & Co.
ATTORNEYS.

UNITED STATES PATENT OFFICE.

OLE MARTINSON, OF MERIDIAN, WISCONSIN.

MEASURING-FAUCET.

SPECIFICATION forming part of Letters Patent No. 377,165, dated January 31, 1888.

Application filed September 16, 1887. Serial No. 249,873. (No model.)

*To all whom it may concern:*

Be it known that I, OLE MARTINSON, of Meridian, in the county of Dunn and State of Wisconsin, have invented a new and Improved Measuring Apparatus, of which the following is a full, clear, and exact description.

This invention consists of certain combinations and constructions of parts for use in relation to a suitable supply, whereby the measuring thereof is accomplished with the greatest ease and accuracy without waste or the entrance of dirt or insects, &c., to the liquid or commodity being measured, all substantially as hereinafter shown, described, and pointed out in the claims.

Reference is to be had to the accompanying drawings, forming a part of this specification, in which similar letters of reference indicate corresponding parts in both figures.

Figure 1 is a central vertical longitudinal section through the measuring apparatus, and Fig. 2 is an end view of the same with the measuring-receptacle shown as swung into a discharging position.

In the drawings, A represents the measuring-receptacle, shown as consisting of a cylindrical casing of glass, &c., having marks or graduations $a$ thereon to indicate the divisions or subdivisions of the measuring capacity, as of gallons, kiloliters, &c., closed at each end by detachable heads C $C^2$, secured on and to said casing by bolts or rods $d$, having heads $e$, and nuts $e^2$, passing through and between the flanges $c$ of the heads outside of the cylindrical casing, said casing being provided between its ends and said heads with a suitable packing-ring, $f$, of flexible material, the heads being rabbeted to accommodate the same, and through said rods and their nuts said cylindrical casing and the heads are adapted to be held together as one.

The upper head, C, has thereon a transverse enlargement, $g$, within and through a portion of the length of which is a passage, $h$, which is open at one end, $h^2$, of said enlarged portion, it, by the other end, $h^3$, forming communication with the measuring-chamber, said enlarged transverse portion $g$ extending at one end in a trunnion, $k$, to form a bearing in a journal, $l$, of the supporting-frame, while its other end is provided with a tubular screw-plug or packing-ring, $m$, screwed therein and lying over and around a tube or pipe, D, having a flange, $p$, at its inner end, between the inside of which flange and the end of the screw-plug $m$ is a packing-ring, $n$, of suitable flexible material, said tube D being held from rotation in its rest and bearing in the supporting-frame by the set-screw $p'$, passing through the bearing-block, to be turned to bear upon the side of said pipe. Communication between said pipe and the liquid-supply—such, for instance, as a sirup-barrel, G—is formed and closed by the turning of a cock, E, which, when open, will allow the liquid to pass from such supply through the tube D into and through the passage $h$ $h^2$ in the head, and thence to the measuring-chamber, where the quantity thereof may be observed and determined as it rises to correspond with the marks of graduation $a$ on the side of said chamber.

Means for securing the withdrawal of the liquid from the measuring-chamber and for the placing of said chamber in position to permit such withdrawal consist of a stop cock or plug, $q$, in the top of the chamber and a screw-cap, $r$, engaging with an extended tube, $s$, having an aperture, $s^2$, in its side, adapted, when said cap is turned down, to close said aperture, but when open to free it for the entrance of air to the interior of the chamber, and of a handle-lever, F, pivoted in ear-pieces $t$ of the end of the trunnion to the head, and adapted to swing and lie parallel with the end frame and between studs $u$ $v$ thereof, one of which has a lug, $v^2$, and is arranged to rotate to bring its lug across the opening $w$ between the studs, and when the end of the handle-lever lies within the space between said studs it is there held by such lug $v^2$, maintaining the measuring-chamber in a rigid position, either with its top uppermost or with its bottom uppermost, according to whether it is intended to fill or discharge said vessel.

While the apparatus described is particularly intended for use in measuring liquids, it is applicable for use in measuring granulated commodities.

Having thus fully described my invention, I claim as new and desire to secure by Letters Patent—

1. A measuring apparatus consisting of a measuring-receptacle having upper and lower closed ends, the former being provided with an outlet-passage and a transversely-extending outwardly-projecting enlargement hung for a rotatable bearing on suitable supports, and provided with a passage therein leading from its one end to the receptacle-chamber, and at such end adapted for a connection with a supply-conduit, substantially as and for the purpose described.

2. A measuring apparatus consisting of a measuring-receptacle having upper and lower closed ends, the latter provided with an opening and closing vent-plug and the former having an outlet-passage and a transversely-extending and outwardly-projecting enlargement hung for a rotatable bearing on suitable supports, and provided with a passage therein leading from its one end to the receptacle-chamber, and at such end adapted for a connection with a supply-conduit, substantially as and for the purpose described.

3. A measuring apparatus consisting of a measuring-receptacle formed by a body and ends or heads which lie upon and against and project over the ends of said body, and secured thereto by headed rods and nuts, having at its top a stop-cock and at its bottom a vent-plug, and provided with means for conveying the commodity to be measured thereto and for inverting said receptacle, substantially as and for the purpose described.

4. A measuring apparatus consisting of a measuring-receptacle formed by a body and ends or heads which lie upon and against and project over the ends of said body, with the flexible packing-rings interposed and secured thereto by headed rods and screw-nuts, having at its top a stop-cock and at its bottom a vent-plug, and provided with means for conveying the commodity to be measured thereto and for inverting said receptacle, substantially as and for the purpose described.

5. The combination, with the measuring-receptacle having upper and lower closed ends, the former provided with a cock and having the transverse enlarged portion $g$, with a passage leading from one end thereof to the interior of the receptacle, and its other end provided with a trunnion having a bearing in a suitable support, of a pipe or passage suitably supported leading from the supply to be measured, adapted to be opened and closed and to enter and form a close bearing for the open end of the enlarged portion, all substantially as and for the purpose described.

6. The combination, with the measuring-receptacle having upper and lower closed ends, the former provided with a cock and having the transverse enlarged portion, with a passage leading from one end thereof to the interior of the receptacle, its other end having a trunnion, $k$, having a bearing in a suitable support, of a pipe with a flanged end suitably supported leading from the supply to be measured, and adapted to be opened and closed, and entering the open end of said enlarged portion, and the screw packing-collar, all substantially as and for the purpose described.

7. The combination, with the measuring-receptacle having upper and lower closed ends, the former provided with a cock and having the transverse enlarged portion $g$, with a passage leading from one end thereof to the interior of said receptacle, and its other end provided with a trunnion, $k$, having a bearing in a suitable support, and provided with a lever arm or handle, of a pipe or passage suitably supported leading from the supply to be measured, adapted to be opened and closed and to form a close bearing for the open end of said enlarged portion of the receptacle, all substantially as and for the purpose described.

8. The combination, with the measuring-receptacle having upper and lower closed ends, the former provided with a cock and having the transverse enlarged portion $g$, with a passage leading from one end thereof to the interior of said receptacle, and its other end provided with a trunnion, $k$, having a bearing in a suitable support, and provided with ear-pieces $t$, to which is pivotally hung a lever-arm, F, of a pipe or passage suitably supported leading from the supply to be measured, adapted to be opened and closed and to form a close bearing for the open end of said enlarged portion $g$, and the studs $u\ v$, located for the engagement of said handle-lever, all substantially as and for the purpose described.

9. The combination, with the measuring-receptacle having upper and lower closed ends, the former provided with a cock and having the transverse enlarged portion $g$, with a passage leading from one end thereof to the interior of said receptacle, and its other end provided with a trunnion, $k$, having a bearing in a suitable support, and provided with ear-pieces $t$, to which is pivotally hung a lever-arm, F, of a pipe or passage suitably supported leading from the supply to be measured, adapted to be opened and closed and to form a close bearing for the open end of said enlarged portion $g$, and the studs $u\ v$, the latter having a lug, $v^2$, and adapted for rotation, substantially as and for the purpose specified.

OLE MARTINSON.

Witnesses:
ELMER E. STANTON,
GEO. H. PETTIS.